(No Model.)
F. D. BELL.
POTATO PLANTER AND DIGGER.
No. 577,710. Patented Feb. 23, 1897.
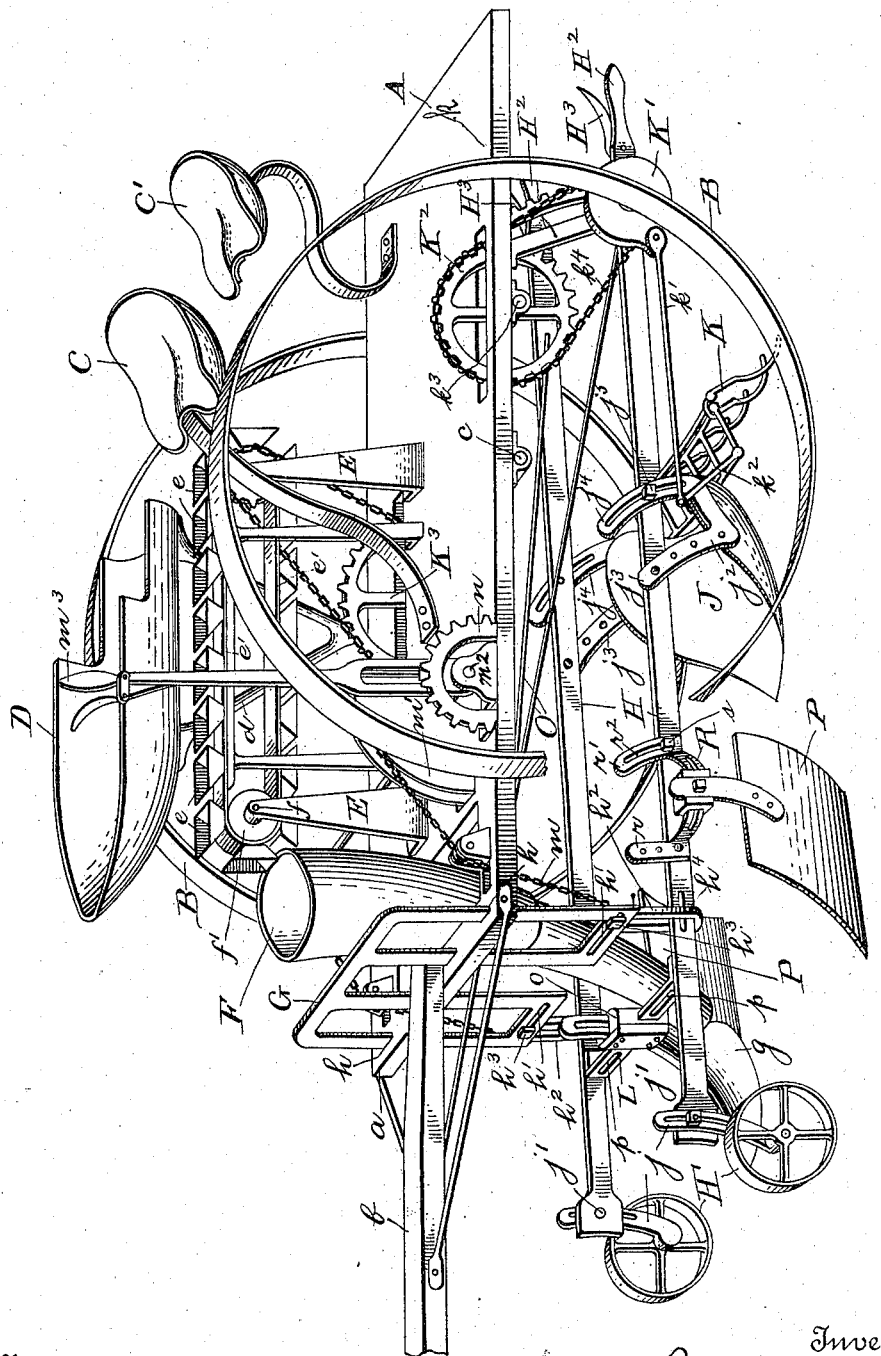
Witnesses
Albert B. Blackwood.
John A. Saul.
Inventor
Frederick D. Bell
by Fenelon B. Brock
Attorney

UNITED STATES PATENT OFFICE.

FREDERICK D. BELL, OF HORNELLSVILLE, NEW YORK.

POTATO PLANTER AND DIGGER.

SPECIFICATION forming part of Letters Patent No. 577,710, dated February 23, 1897.

Application filed January 7, 1896. Serial No. 574,568. (No model.)

*To all whom it may concern:*

Be it known that I, FREDERICK D. BELL, a citizen of the United States, residing at Hornellsville, in the county of Steuben and State of New York, have invented certain new and useful Improvements in Potato Planters and Diggers; and I declare the following to be a full, clear, and exact description of the invention, such as will enable others skilled in the art to which it appertains to make and use the same, reference being had to the letters of reference marked on the accompanying drawing, which forms a part of this specification.

My invention relates to improvements in potato planters and diggers; and the objects of my invention are to provide a machine which will mark the row, drop the potatoes into said row, and cover up the hill or row at the same time, also to provide an attachment for the machine to dig the potatoes.

With these objects in view my invention resides in the novel construction, combination, and arrangement of parts and in the various details thereof, as will hereinafter be set forth and claimed.

The figure is a perspective of the machine.

In the drawing forming a part of my specification, and in which like symbols of reference indicate corresponding parts, A represents the frame or body of the machine, and to the front bar or head $a$ thereof is secured the tongue or pole $b$.

B designates the wheels upon which the frame is mounted, and $c$ the axle thereof.

C designates the driver's seat, and C' a seat provided at the rear of the machine for the person feeding the material, said seats being secured to the frame of the machine by suitable supports.

D denotes a box or other suitable receptacle supported in a tilted or oblique position by means of a leg $d$, secured to the frame or body A. This box or receptacle D is designed to be filled with potatoes, from whence they may be distributed to the cups $e$, secured to the belt $e'$, by the hand of the person in the seat C', or said box D may be provided with means to automatically discharge the potatoes into the cups.

E are vertical supports secured to the frame or body A and forming bearings for the axles $f$, upon which the belt-pulleys $f'$ and the driving-pulley, having belt connection with the axle $c$, are mounted. Upon the pulley-wheels $f'$ revolves the endless belt $e'$, provided with the cups $e$, each of which is adapted to receive a potato or a slice thereof from the hand of the feeder or directly from the box or receptacle D and convey the same to a pipe or dropper F, into which each potato is fed.

F represents a tube or dropper consisting of a pipe or tube suitably secured to the frame A and extending obliquely from beneath the cup-belt $e'$ to the rear of the former or opener $g$. This tube or dropper F increases in diameter toward the upper end, which is flared outwardly to catch the potatoes as they are fed from the delivering-cups $e$. If desired, the said tube or dropper F may be constructed in two parts or sections, as shown, adapted to telescope or slide one within the other in order that the lower end thereof may be adjusted to any desired distance from the ground.

At the forward part of the main frame A is arranged a vertical frame G, sliding in plates or guides $h$, attached to the front bar of the main frame. The lower portion of the frame G is open at the center, and on its sides are formed horizontal slots $h'$, and connected to said side pieces are slotted links or connections $h^2$, which support horizontal rods or bars H, said bars H being adjustable laterally and vertically by means of bolts $h^3$ and $h^4$, attaching the connecting-link to the frame G and bars H.

At the forward ends of the bars H are adjustable wheels H', which act as self-adjusters to the make of the ground, said wheels being vertically adjustable with relation to the bars H by means of slots $j$ in their supporting-legs $j'$, passing through said slots $j$ and bars H. The rear ends of the bars H are provided with handles H² and pawls H³, working in segmental racks H⁴, attached to the main frame, by means of which the bars H are capable of vertical adjustment at their rear ends.

J represents the detachable digger, which is bolted to the bars H by means of a plate $j^2$, having arms $j^3$ $j^4$, in the latter of which is formed a slot and through which passes an adjusting-bolt $j^5$, by means of which the point of the digger may be elevated or depressed.

K represents a separator pivotally attached to the rear of the digger and being also pivotally attached at its center, its rear fingers curving upwardly.

K' is a wheel or disk rigidly attached to the outer end of a shaft which is journaled in a support $k$, depending from the lower side of the main frame, and to the outer end of said wheel K' is connected a pitman $k'$, which in turn connects with a link $k^2$, rigidly connected to a rod at the rear of the digger.

K² is a sprocket or spur wheel journaled on a shaft $k^3$ and having a sprocket-chain $k^4$ connecting it with a sprocket-wheel (not shown) on the shaft of wheel K'.

K³ is a sprocket-wheel rigidly journaled to axle $c$ and having a sprocket-chain connecting it to a driving wheel or pulley on shaft $f$, said wheel K³ also having a pinion to engage with a pinion on shaft $k^3$. Thus it will be seen that as motion is imparted to wheel K³ by shaft $c$ it will operate the feeding or the digging part of the apparatus, as may be desired, it being understood that I may detach either part of my invention when required, or I may provide the pulley on shaft $f$ with a clutch arrangement to throw the same into or out of operation.

The frame G is adjusted vertically by means of chains $m$, attached to its lower rear portions, said chains passing over sector-plates $m'$, rigidly secured to a shaft $m^2$, said shaft being operated by a hand-lever $m^3$, attached rigidly thereto, and having pawls engaging with a segmental rack $n$ on the main frame.

The former or opener $g$ is supported by a cross-bar L, connecting the forward ends of the horizontal bars H, said bar L passing through a slot formed in the shank of the former, by means of which and clamp $o$ the former may be adjusted vertically, or it may be provided with bolts or otherwise, as may be desired. The cross-bar L is also provided with a series of slots $p$, by means of which the former may be adjusted laterally.

O are rods for connecting the rear ends of the bars H to the forward end of the main frame or to the tongue, as may be desired, in order that the draft may come directly on the rods H.

P are wings or plates attached to the bars H by means of plates R, said plates having arms $r\ r'$, the latter of which are provided with slots $r^2$, in which work bolts $s$, passing into the bars H and by means of which said plates may be adjusted vertically. The main portion of the plate R is also provided with a horizontal slot through which an adjusting-bolt passes and by means of which said wings may be adjusted laterally. When said wings are used with the planter, they are inclined outwardly and when used with the digger inwardly.

The arms $r$ and $j^3$ of the wings and digger are provided with bolt-holes, through which bolts pass into the bars H and by means of which they may be adjusted vertically.

Having now fully described my invention, what I claim as my invention, and desire to secure by Letters Patent, is—

1. In a potato-machine, an opener, a dropper, means for feeding the potatoes within said dropper, laterally and vertically adjustable plates or wings for covering the potatoes, horizontal bars carrying said opener and wings, and adjustable wheels at the forward ends of said bars, substantially as set forth.

2. In a potato-machine, an adjustable opener, a dropper, a receiver, means for conveying the potatoes from the receiver to the dropper, wings for covering the potatoes, horizontal bars for carrying said opener and wings, and means for adjusting the rear ends of said horizontal bars, substantially as described.

3. In a potato-machine, the combination with the horizontal adjustable bars carrying the former or opener and covering-wings, of a frame at the front of said machine supporting said horizontal bars, means for adjusting and locking said frame, and means for adjusting the covering-wings both laterally and vertically.

4. The combination with a supporting part, of a pivoted digger and digger-adjusting mechanism, a separator pivoted to the digger at its rear edge, a connecting-link having a crank-arm, mechanism for vibrating the separator by means of the crank-arm, and a plurality of fingers pivoted to the rear extremity of the separator.

5. The combination with a pair of supporting-bars, of vertically and laterally adjustable wings depending therefrom, a pivoted digger carried by the bars behind the wings, a separator pivoted to the rear edge of the digger, a connecting-link having a crank-arm, and mechanism connected with the crank-arm for continuously vibrating the separator while the machine is in motion.

6. In a digging attachment for potato-machines, a digger upwardly inclined from its forward edge and provided with rearwardly-projecting and downwardly-inclined fingers carried by the digger.

7. In a digging attachment for potato-machines, the combination with laterally-adjustable plates, of a digger secured to the machine at points behind and in line with each of said plates.

8. In a digger attachment for potato-machines, the combination with a pair of horizontal bars, of adjustable plates or wings secured thereto, and a digger adjustably secured to each of the bars respectively, behind the plates.

9. In a digger attachment for potato-machines, the combination with horizontal bars, of adjustable plates or wings secured thereto, a digger directly attached to each of said bars, and mechanism for simultaneously adjusting the bars.

10. In a digging attachment, the combination with laterally-adjustable soil-removing plates, a digger behind said plates, fingers secured to the digger, pivoted fingers carried by said first-named fingers, and means for adjusting the digger.

11. In a convertible potato planting and digging machine, a main frame carrying a supplemental frame, adjustable soil-throwing plates on the sides of said supplemental frame, an opener on said supplemental frame in front of and on a median line between said soil-throwing plates, the said supplemental frame being adapted to carry a digger at the rear of said plates, the opener and digger being adjustable into and out of operative position at will, substantially as described.

In testimony whereof I affix my signature in the presence of two witnesses.

FREDERICK D. BELL.

Witnesses:
C. L. THOMAS,
C. K. MASON.